US012157324B2

(12) United States Patent
Zhang et al.
(10) Patent No.: US 12,157,324 B2
(45) Date of Patent: Dec. 3, 2024

(54) PRINTHEAD PRESSURE ARM ASSEMBLY FOR A PRINTING APPARATUS

(71) Applicant: Hand Held Products, Inc., Charlotte, NC (US)

(72) Inventors: Yang Zhang, Mount Laurel, NJ (US); David Chaney, Fort Mill, SC (US); Sean Kearney, Mount Laurel, NJ (US); Florante Go, Singapore (SG); Christopher Wiencek, Mount Laurel, NJ (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/191,766

(22) Filed: Mar. 28, 2023

(65) Prior Publication Data

US 2024/0326488 A1 Oct. 3, 2024

(51) Int. Cl.
*B41J 25/312* (2006.01)

(52) U.S. Cl.
CPC .................................... *B41J 25/312* (2013.01)

(58) Field of Classification Search
CPC ............................... B41J 25/312; B41J 25/304
See application file for complete search history.

(56) References Cited

U.S. PATENT DOCUMENTS 4,626,873 A 12/1986 Kotani et al.
5,366,302 A * 11/1994 Masumura ............... B41J 25/34 400/120.16
6,480,216 B2 11/2002 Ando
6,765,602 B2 7/2004 Mori
7,246,959 B2 7/2007 Nakatani
8,564,633 B2 * 10/2013 Matsushima .............. B41J 2/32 347/197
2005/0024473 A1 2/2005 Kamata
2011/0193926 A1 * 8/2011 Matsushima .............. B41J 2/32 347/197
2015/0054906 A1 * 2/2015 Onodera .................. B41J 25/34 347/197

FOREIGN PATENT DOCUMENTS

JP 2001-063106 A 3/2001

* cited by examiner

*Primary Examiner* — Kristal Feggins
(74) *Attorney, Agent, or Firm* — Alston & Bird LLP

(57) ABSTRACT

Various embodiments are directed to a printhead pressure arm assembly for a printing device. In various embodiments, the printhead pressure arm assembly comprises a pressure arm comprising an arm base element defined by an arm base length; and distal arm wings extending from a distal end of the arm base element in outward directions perpendicular to the arm base length, wherein the pressure arm defines a T-shaped configuration; and one or more leaf spring elements operably secured to a respective bottom surface of each distal arm wing and configured to operatively engage a printhead assembly; wherein each leaf spring element defines a flexible configuration to facilitate an elastic contact with the printhead assembly; and wherein the leaf spring elements define evenly distributed contact points through which the printhead pressure arm assembly is configured to apply a collective pressure force onto the printhead assembly in an at least substantially uniform distribution.

20 Claims, 5 Drawing Sheets

PRINTHEAD PRESSURE ARM ASSEMBLY FOR A PRINTING APPARATUS

FIELD OF THE INVENTION

Various embodiments described herein relate generally to relate generally to printers, and more particularly, to a printhead pressure arm assembly for thermal printing.

BACKGROUND

Applicant has identified many technical challenges and difficulties associated with conventional printing apparatuses, such as industrial thermal printers. Through applied effort, ingenuity, and innovation, Applicant has solved problems related to these printer apparatuses by developing solutions embodied in the present disclosure, which are described in detail below.

BRIEF SUMMARY

Various embodiments are directed to printhead pressure arm assemblies for printing apparatuses and method of using the same. In various embodiments, a printhead pressure arm assembly for a printing apparatus may comprise a pressure arm comprising an arm base element defined at least in part by an arm base length oriented in a first direction; and one or more distal arm wings extending from a distal end of the arm base element in one or more outward directions perpendicular to the first direction; wherein the pressure arm defines a T-shaped configuration based at least in part on the one or more distal arm wings extending perpendicularly outward from the distal end of the arm base element; and one or more leaf spring elements operably secured to a respective bottom surface of each of the one or more distal arm wings, each of the one or more leaf spring elements being configured to operatively engage at least a portion of a printhead assembly; wherein each of the one or more leaf spring elements defines a flexible configuration such that the operative engagement of the one or more leaf spring elements with the printhead assembly is defined by an elastic contact; and wherein the one or more leaf spring elements define one or more evenly distributed contact points through which the printhead pressure arm assembly is configured to apply a collective pressure force onto the printhead assembly in an at least substantially uniform distribution.

In various embodiments, the one or more leaf spring elements may be defined by a first leaf spring element secured to a first portion of the one or more distal arm wings and a second leaf spring element secured to a second portion of the one or more distal arm wings, wherein the first leaf spring element and the second leaf spring element define an at least substantially symmetric configuration over a plane of symmetry extending in the first direction. In various embodiments, the one or more distal arm wings may comprise a first distal arm wing extending from the distal end of the arm base element in a first perpendicular direction and a second distal arm wing extending from the distal end of the arm base element in a second perpendicular direction opposite the first perpendicular direction. In various embodiments, the pressure arm may be configured for coupling to one or more internal printer components via an attachment features defined at a proximal end of the arm base element. In certain embodiments, the attachment features may define an attachment aperture configured to receive a shaft component therethrough to fixedly secure the printhead pressure arm assembly in a position above the printhead assembly. In certain embodiments, the shaft component may be oriented in a width direction and the pressure arm is secured at a central position along a width the shaft component.

In various embodiments, the one or more leaf spring element may be made of an at least partially metallic material. In various embodiments, the one or more contact points defined by the one or more leaf spring elements may be defined by a plurality of pressure contact members uniformly distributed along one or more bottom surfaces of the one or more leaf spring elements. In various embodiments, the plurality of pressure contact members may be evenly distributed along a width of the one or more leaf spring elements such that the plurality of pressure contact members is configured to facilitate transmission of the collective pressure force to the printhead assembly engaged therewith. In certain embodiments, the plurality of pressure contact members may include a first set of pressure contact members disposed along a first bottom surface defined by a first leaf spring element coupled to the first distal arm wing and a second set of pressure contact members disposed along a second bottom surface defined by a second leaf spring element coupled to the second distal arm wing. In certain embodiments, the plurality of pressure contact members may define eight pressure contact members evenly distributed along a width of the printhead pressure arm assembly. In certain embodiments, the first set of pressure contact members and the second set of pressure contact members may each be defined by four pressure contact members.

In various embodiments, each of the one or more leaf spring elements may comprise a central portion fixedly secured to a bottom surface of the one or more distal arm wings defined by the pressure arm, and one or more extension portions extending from the central portion. In certain embodiments, a pressure contact member configured to physically contact the printhead assembly may be provided on a bottom surface of the leaf spring element at least substantially adjacent a distal end of the one or more extension portions. In certain embodiments, each of the one or more leaf spring elements may define an H-shaped configuration defined in part by four extension portions extending from the central portion, and wherein a respective one of four pressure contact members is disposed at each distal end of the four extension portions defined by the H-shaped configuration. In certain embodiments, the flexible configuration of each of the one or more leaf spring elements may be defined by the respective distal ends of each of the one or more extension portions of the leaf spring element being configured to move in one or more vertical directions relative to the central portion fixedly secured to the pressure arm. Further, in certain embodiments, the respective distal ends of the one or more extension portions moving relative to the central portion may define an elastic deformation of the leaf spring element. In various embodiments, each leaf spring element may define an at least substantially symmetrical configuration defined by a first one or more extension portion provided on a first lateral side of the central portion having a mirrored configuration relative to a second one or more extension portion provided on a second lateral side of the central portion.

In various embodiments, each of the one or more leaf spring elements may define a nominal configuration in which the leaf spring element has an at least substantially flat planar configuration. Further, various embodiments are directed to a printing apparatus comprising the printhead pressure arm assembly described herein.

BRIEF DESCRIPTION OF THE DRAWINGS

Reference will now be made to the accompanying drawings, which are not necessarily drawn to scale, and wherein.

DETAILED DESCRIPTION

Figure 1:
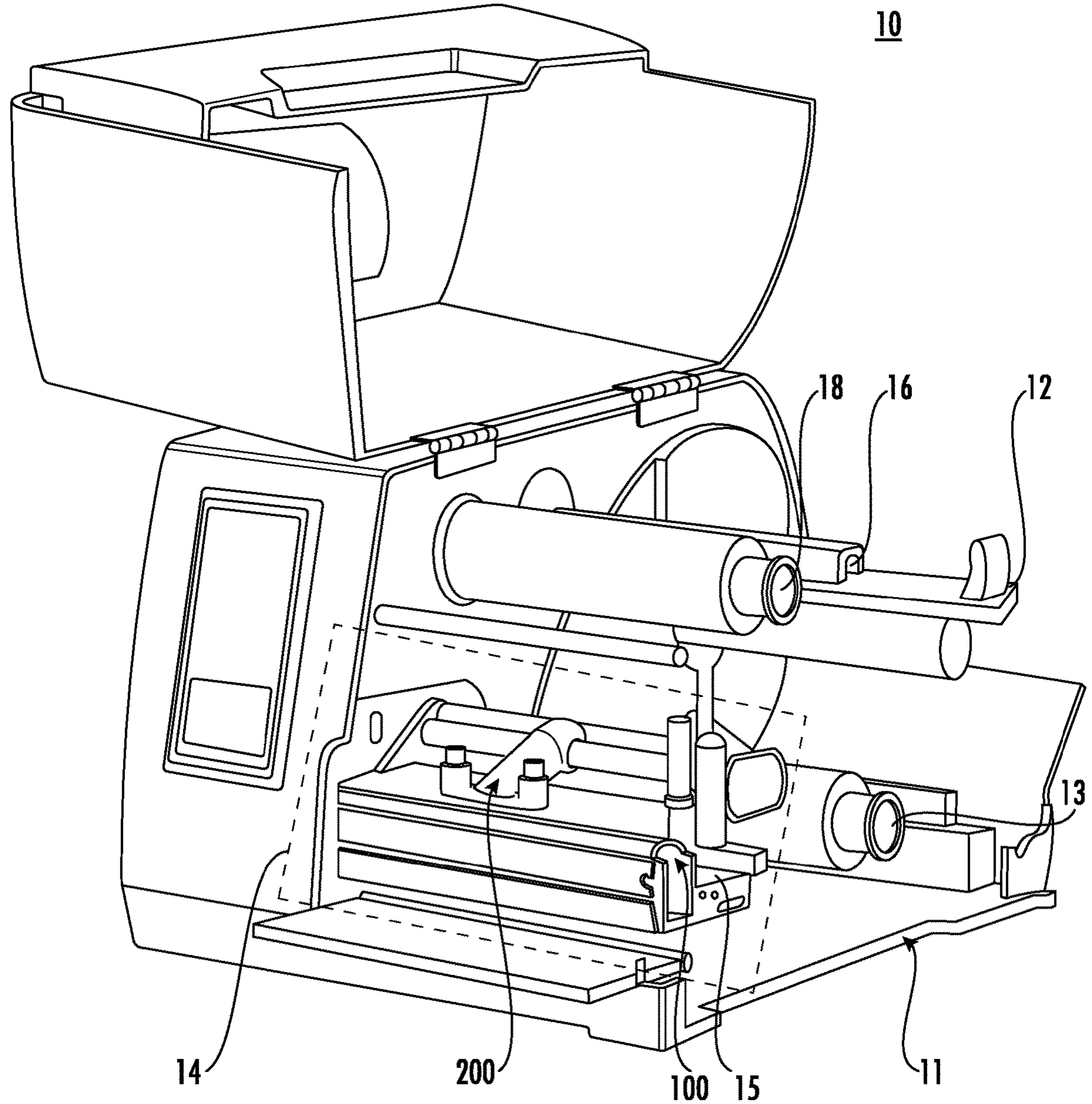
FIG. 1 illustrates a perspective view of an exemplary printing apparatus in accordance with various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words “example,” or “exemplary,” when used herein, are intended to mean “serving as an example, instance, or illustration.” Any implementation described herein as an “example” or “exemplary embodiment” is not necessarily preferred or advantageous over other implementations.

Printing apparatuses, such as copiers, printers, facsimile devices or other systems, are capable of reproducing content, visual images, graphics, texts, etc. on a print media. Some examples of the printing apparatuses may include, but not limited to, thermal printers, inkjet printers, laser printers, and/or the like.

A conventional industrial thermal printer often includes a thermal printhead having multiple resistor elements, i.e. heating elements, in burn lines. During operation, passage of electric current through such resistor elements energizes the resistor elements to perform a printing operation. The energized resistor elements generate heat energy to induce markings on print media by selectively heating specific areas of print media or by heating a thermal transfer media (e.g., a ribbon) for various printing applications, such as label printing. Examples of the thermal printers may include thermal transfer printers and direct thermal printers. Typically, in thermal transfer printer, content is printed on the media by heating a coating of a ribbon so that the coating is transferred to the media.

In some example embodiments, a printhead used in a thermal printer includes multiple resistors or heating elements in a burn line disposed on a substrate. With the passage of electric current for controlled time periods, such resistor elements may be energized to perform a printing operation. As a thermal printer may be used to print a variety of substrates, it is advantageous to be able to adjust the pressure applied to the printhead. For example, the pressure applied to the printhead may affect the location of the printhead with respect to the substrate and/or the pressure applied to the substrate by the printhead during the printing operation.

Thus, in various example embodiments a printhead pressure adjustment is provided. The word “print media” is used herein to mean a printable medium, such as a page or a paper, on which content, such as graphics, text, and/or visual images, may be printable. The print media may correspond to a continuous media that may be loaded in a printing apparatus in form of a roll or a stack. In some embodiments, the scope of the disclosure is not limited to having a continuous media. In some embodiments, the print media may be divided into one or more portions through perforations defined along a width of the print media. In an alternate embodiment, the print media is divided into the one or more portions through one or more marks that are defined at a predetermined distance from each other, along the length of the print media. In an example embodiment, a contiguous stretch of the print media, between two consecutive marks or two consecutive perforations, corresponds to a portion of the print media. In some embodiments, the print media may correspond to a thermal media on which the content is printed on application of heat on the print media itself. In alternate embodiments, the print media may correspond to a liner media, a liner-less media, and/or the like.

As described herein, a first direction in which the print media exits from the printing apparatus, as disclosed, corresponds to web direction. A second direction that is horizontally orthogonal/transverse to the web direction corresponds to cross-web direction.

Typically, printing apparatuses, such as thermal printers, inkjet printers, or laser printers, reproduce content, visual images, graphics, texts, etc. on a print media. A conventional industrial thermal printer often includes a thermal printhead having multiple resistor elements, i.e. heating elements, in burn lines. During operation, passage of electric current through such resistor elements generate heat energy to induce markings on the print media by selectively heating specific areas of the print media or by heating a thermal transfer media (e.g., a ribbon) for various printing applications, such as label printing. For such printing, the printhead is positioned such that the print media, typically supplied by a media spool, is held in a pressure contact, and sandwiched between the burn line(s) of the printhead and the platen roller. The platen roller is rotationally driven and heating elements in burnlines are selectively activated, in order to suitably produce the desired image.

The print media utilized for such thermal printers may correspond to a specific type of print media based on various characteristics, such as size, width, thickness, coating, and the like. According to variations observed in printing output and to support different types of print media, the industrial thermal printers may be required to adjust printhead pressure load on the thermal printhead. To maintain an optimum level of print quality, the printhead pressure load is suitably distributed over the region of the printhead under which the media traverses, to prevent uneven printhead pressure load on the thermal printhead. In other words, area of pressure contact developed by the printhead acting through the print media and on to the platen roller must be adequate to produce appropriate contact between the printhead and print media, thereby resulting in thermal energy transfer for proper image formation. Insufficient pressure contact can cause misprinted areas of image on the print media. Conversely, excessive pressure contact can cause increased abrasion and wear-and-tear of the printhead, resulting in premature degradation of printhead and diminished print life.

Existing pressure adjustment methods/mechanisms are cumbersome and not very user-friendly. Such methods/mechanisms require a sequence of actions to be performed by an operator. Further, the aid of a specialized tool may be required by the operator, which in turn may be difficult to operate/handle.

Mostly, for a particular type of print media, there is no standard printhead load or pre-specified setting levels of pressure load modules. The pressure load modules are adjusted with screws or other such mechanisms to evenly balance the pressure load modules. The operator handling the printing apparatus iteratively performs hit-and-trial pressure load settings to ascertain position and load adjustment of the pressure load modules, then operate the printing apparatus to determine if print quality is acceptable. This iterative technique, may take substantial time to achieve optimal print quality, thereby resulting in the print media wastage.

Thus, there is a need for a feature in printing apparatus that flexibly accommodates changes in printhead assembly position—resulting from varying print media thickness, component misalignment, tolerance build-up, and/or the like—by adjusting a printhead pressure load to maintain a continuous and uniformly distributed pressure on the printhead assembly in a seamless and user-friendly manner. The printhead pressure arm assembly, as disclosed herein, includes one or more spring lead elements secured to a fixed pressure arm and configured to define a flexible configuration biased against the printhead assembly, wherein each of the one or more leaf spring elements defines a plurality of pressure contact members configured to evenly distribute a collective pressure force onto the printhead assembly. The printhead pressure arm assembly being configured to maintain physical engagement with the printhead assembly is enabled by the flexible configuration of each of the one or more leaf spring elements, which may elastically deform between a nominal configuration and an actuated configuration in response to a varying printhead assembly force being applied thereto in order to enable a user-free adjustment of the pressure load being uniformly applied to the pressure assembly from the printhead pressure arm assembly.

Having described example embodiments, the design of the various devices performing various example operations is provided below. The components illustrated in the figures represent components that may or may not be present in various embodiments of the disclosure described herein such that embodiments may include fewer or more components than those shown in the figures while not departing from the scope of the disclosure.

FIG. 1 illustrates a perspective view of a printing apparatus, in accordance with one or more embodiments of the present disclosure. In particular, FIG. 1 illustrates an exemplary printer apparatus 10 embodying a thermal printer. The printing apparatus 10 may include a casting 11, a printing assembly 14, a thermal ink printer media take-up assembly module 13, a media supply hub 12, support block assembly 15, a ribbon supply assembly 16, and a ribbon take-up assembly 18.

In some embodiments, various components in the printing apparatus 10 may be independently attachable to and detachable from the casting 11. As such, the printing apparatus 10 may be easily and quickly converted from an ink ribbon printer to a thermal ink printer and vice-versa by installing the appropriate printhead assembly and the appropriate media take-up assembly module into the printing apparatus 10. As a non-limiting example provided for illustrative purposes, in various embodiments, the printing assembly 14 of an exemplary printing apparatus 10 may be independently attachable to and detachable from the casting 11. Additionally, different circuit boards may be installed for selectively controlling operation of the printing apparatus 10. For example, different circuit boards or additional circuit boards may be installed to convert the printing apparatus 10 from the thermal ink printer to the ink ribbon printer or vice-versa.

The casting 11 may operate as a support body for the printing apparatus 10 and may include various structural features, such as, for example, a central support member and/or a base member, that may be monolithically formed from a heat conductive material, such as cast aluminum, ceramics, plastics, sheet metal, and the like. By casting the various structural features of the casting 11 monolithically, heat dissipation from within the printing apparatus 10 may be improved, in some examples. The casting 11 may include various recesses configured to receive each of the assemblies in a specific orientation such that when each of the assemblies is secured to the casting 11, the assemblies are supported in an operative configuration.

In various embodiments, the printing assembly 14 of an exemplary printing apparatus 10 may comprise various assemblies, such as, for example, a printhead assembly 100 and a printhead pressure arm assembly 200, that in conjunction with each other, are configured to facilitate and/or perform one or more functions of a printing operation being executed by the printing apparatus 10. The printhead assembly 100 and the printhead pressure arm assembly 200 of the printing assembly 14 are described in detail herein in reference to FIGS. 3 and 4A-4B, respectively.

The support block assembly 15 may include various support portions, one or more of which may be releasably engaged with a portion of a printhead lever arm of the print assembly 14. The support block assembly 15 may include various components, such as a platen mounting block, a platen assembly, a retainer bracket, a media guide, and a tear bar (not shown in FIG. 1). The support block assembly 15 may further be a replaceable part in the printing apparatus 10.

The thermal ink printer media take-up assembly module 13 may include at least a hub assembly (not shown in FIG. 1) configured to support a media take-up roll. The thermal ink printer media take-up assembly module 13 may be operable when the printing apparatus 10 is operated as a thermal ink printer.

The media supply hub 12 may include at least a hub and an adjustable retaining member (not shown in FIG. 1). After the media supply roll is positioned on the media supply hub 12, an adjustable retaining member may be pivoted back to a position perpendicular to the media supply hub 12 and slid into contact with the media supply roll to retain the media supply roll on the hub 12.

The ribbon supply assembly 16 and the ribbon take-up assembly 18 may, in some embodiments, be operable in an instance in which the printing apparatus 10 is operated as a thermal transfer printing apparatus or an ink ribbon printer. The ribbon take-up assembly 18 may include a hub that is driven by the drive mechanism of printing apparatus 10 to unwind ribbon from the spool of ribbon positioned on the hub assembly of ribbon supply assembly 16. As ribbon is unwound from the hub assembly, torque from the spool of ribbon is translated from the spool of ribbon, through hub portions and torsion springs to a ribbon supply shaft (not shown in FIG. 1). Accordingly, a back tension is created in the ribbon as each torsion spring is put in torque. Because the hub portions are independently rotatable about the ribbon supply shaft, the amount of back tension created in the ribbon is proportional to the width of the spool of ribbon. The ribbon take-up assembly 18 may be configured and adapted to receive the ribbon.

Figure 2:
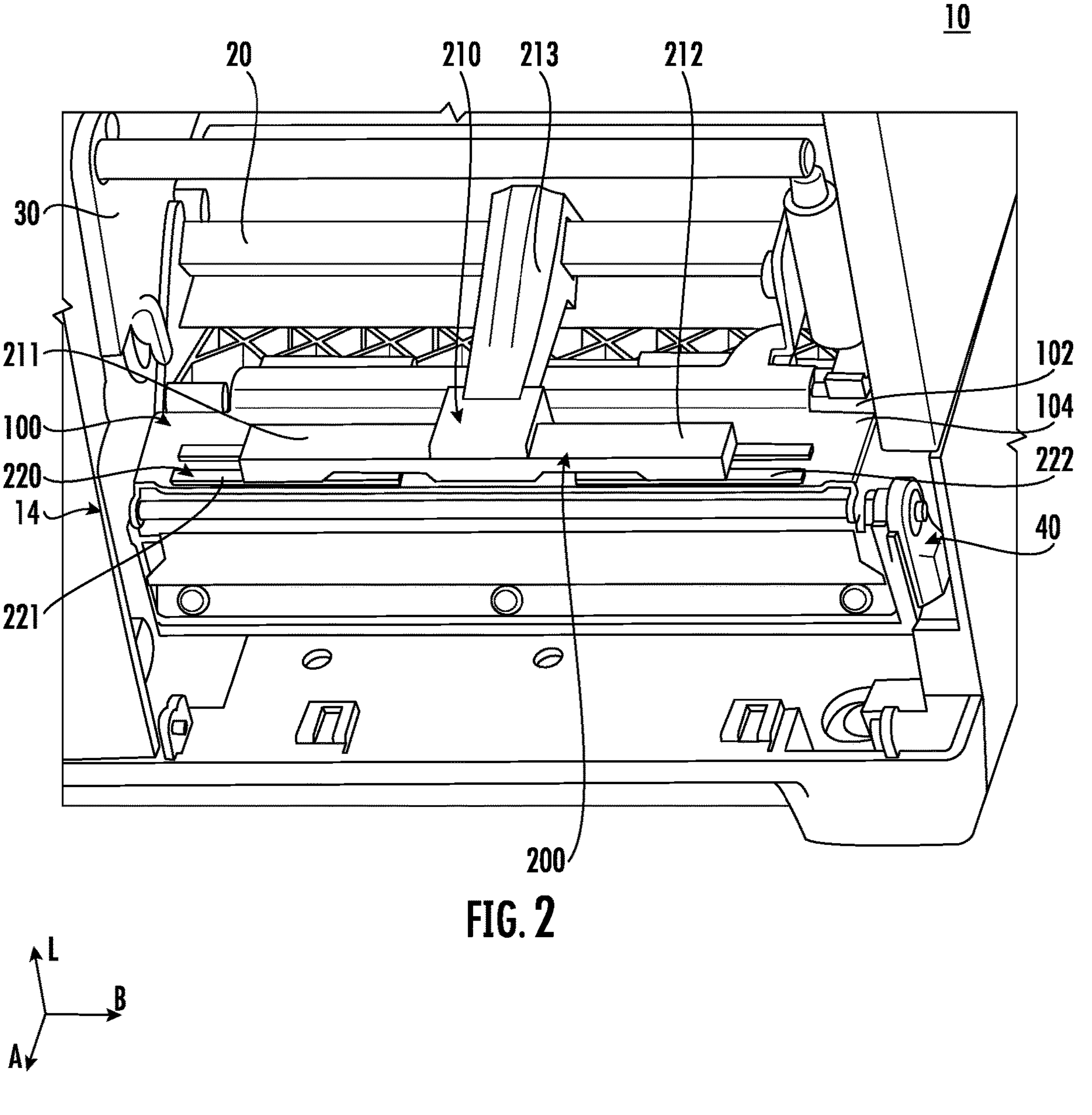
FIG. 2 illustrates a perspective view of an exemplary printing apparatus comprising a printhead pressure arm assembly in accordance with various embodiments of the present disclosure.
Figure 3:
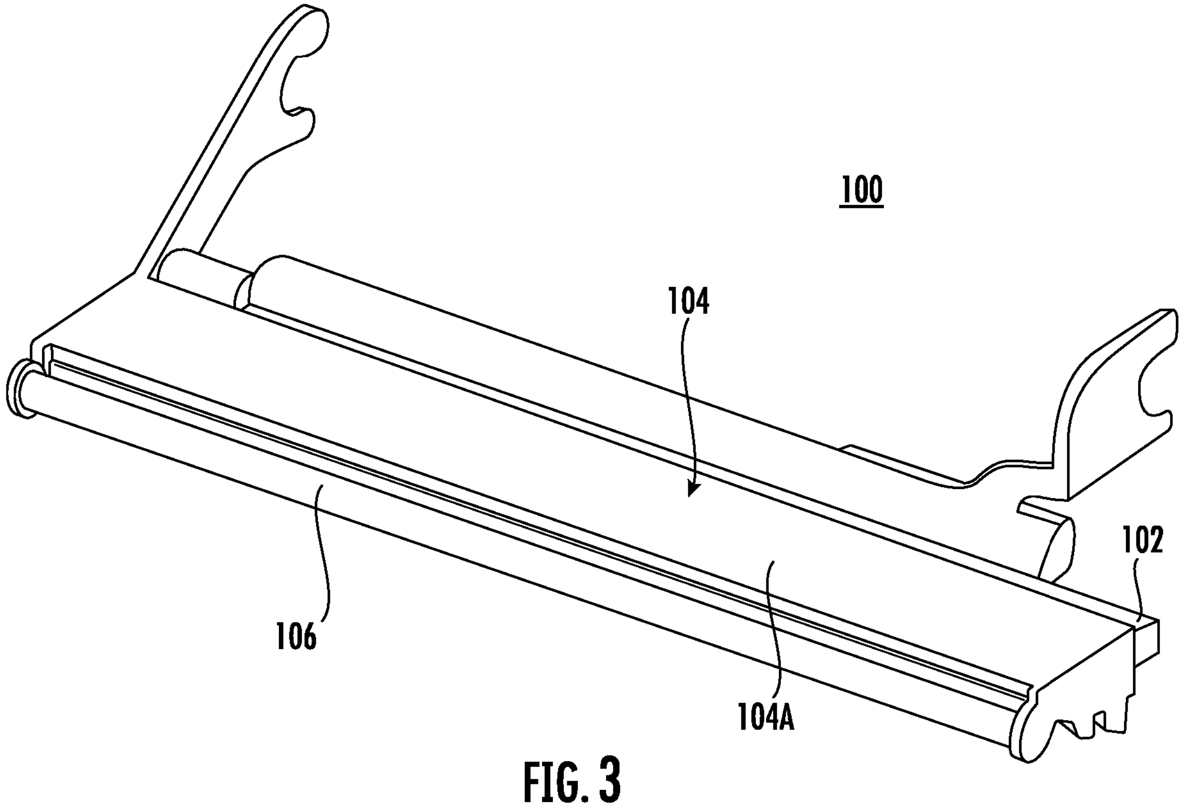
FIG. 3 illustrates a perspective view of a printhead assembly of an exemplary printing apparatus in accordance with various embodiments of the present disclosure.

In various embodiments, an example printhead assembly 100, as described in detail with respect to FIG. 3, may be configured to mate with at least a portion of a platen assembly (not shown in FIG. 1) during operation of the printer apparatus 10. Further, as described herein, the printhead assembly 100 may be pivotably (e.g., rotatably) mounted in the printing apparatus 10. In various embodiments, the printhead assembly 100 may form an integral unit or module that is bolted to the casting 11 to secure the printhead assembly 100 within the printing apparatus 10. As illustrated, the FIG. 2 illustrates a perspective view of an exemplary printing apparatus comprising a printhead pressure arm assembly in accordance with various embodiments of the present disclosure. In particular, FIG. 2 illustrates an exemplary printer apparatus 10 comprising a printer assembly 14 defined at least in part by a printhead assembly 100 and a printhead pressure arm assembly 200. As illustrated, the printhead assembly 100 may be provided in a printing position defined by the printhead assembly 100 being positioned in a proper alignment relative to a platen roller 40 to enable execution of a printing operation by the printing apparatus 10 (e.g., by the printing assembly 14). The platen roller 40 in the platen assembly may be a motor generated driver that may drive the print media forward and/or backward (e.g., in a web direction A, as defined by the orientation in the exemplary embodiment illustrated in FIG. 2) past at least a portion of the printhead assembly 100. For example, the printing position defined by the printhead assembly 100 may include at least a portion of the printhead assembly 100, such as, for example, at least a portion of a printhead plate (not shown) of a printhead 102 and/or a top surface of the printhead bracket 104, being disposed at least substantially above an upper portion of the platen roller 40 such that the platen roller 40 provides a counter-pressure to the printhead assembly 100 in an upward vertical direction (e.g., in the positive L-direction, by the orientation in the exemplary embodiment illustrated in FIG. 2).

As illustrated in FIG. 2, the printhead assembly 100 may be defined a printhead width extending in a direction transverse to a web direction A of a print media, such as, for example, a cross web-direction B. The web direction A corresponds to direction of exit of a print media (not shown) from the printing apparatus 10 upon being printed by the printing assembly 14 as the print media is being dispensed from the printing apparatus 10.

In various embodiments, at least a portion of the printhead assembly 100 may be engaged by the printhead pressure arm assembly 200 of the printing assembly 14. The printhead pressure arm assembly 200 may be secured relative to a shaft 20 disposed within an interior of the printing apparatus 10. The shaft 20 extends in the cross web-direction B that is transverse to the web direction A of the print media, as defined by the orientation of the exemplary embodiment illustrated in FIG. 2. While the cross-sectional shape of the shaft 20 may be a square with chamfered edges, as illustrated in FIG. 2, the present disclosure contemplates that the cross-sectional shape of the shaft 20 may be defined by a rectangle, any other parallelogram, a circle, and/or the like, without deviating from the scope of the disclosure.

The shaft 20 may be arranged at a height relative to at least a portion of the printhead assembly 100 (e.g., a top surface of the printhead bracket 104) such that at least a portion of the printhead pressure arm assembly 200 fixedly connected to the shaft 20 may physically engage the printhead assembly 100, as described herein. In various embodiments, as described in further detail herein, the printhead pressure arm assembly 200 may comprise a plurality of pressure contact members 230 uniformly distributed about one or more bottom surface(s) of one or more leaf spring elements 220. For example, the printhead pressure arm assembly 200 may be fixedly secured to the shaft 20 in a position relative to the printhead assembly 100 such that each of the pressure contact members 230 are configured to contact a respective portion of an upward-facing surface of the printhead assembly 100 (e.g., a top surface of the printhead bracket 104, a top surface of the printhead plate defined by the printhead 102, and/or the like) and apply a respective pressure force to the printhead assembly 100 in an at least substantially downward direction (e.g., a counterforce corresponding to an upward force imparted on the pressure contact members from the surface of the printhead assembly 100 engaged therewith). For example, the printhead pressure arm assembly 200 may be arranged relative to the printhead assembly 100 such that the plurality of pressure contact members 230 physically abut an adjacent surface of the printhead assembly 100 (e.g., the printhead bracket 104) result in an at least substantially uniform collective pressure force being applied from the printhead pressure arm assembly 200 to the printhead assembly 100 in a direction at least substantially towards the platen roller 40 disposed therebelow (e.g., in the negative L-direction, by the orientation in the exemplary embodiment illustrated in FIG. 2). In various embodiments, the uniform distribution of the collective pressure force from the printhead pressure arm assembly 200 to the printhead assembly 100 may be enabled by the printhead pressure arm assembly 200 having an at least substantially symmetrical configuration as defined in the width direction (e.g., the plane of symmetry of the printhead pressure arm assembly 200 is defined by the A-L plane, as illustrated in the exemplary orientation of the embodiment shown in FIG. 2) and the printhead pressure arm assembly 200 being secured to a central portion along the width of the shaft 20 (e.g., as measured in the cross-web B-direction, as defined in the orientation of the exemplary embodiment illustrated in FIG. 2).

In various embodiments, upon the printhead assembly 100 being arranged in the printing position with the printhead 102 (e.g., the printhead plate) engaged with the platen roller 40 such that the printing assembly 14 is operable to execute a printing operation, the printhead pressure arm assembly 200 is configured to maintain a consistent pressure on the printhead assembly 100 that presses the printhead assembly 100 (e.g., the printhead) into the plate roller 40 and/or against a portion of print media disposed therebetween in an at least substantially uniform manner. For example, at least a portion of the printhead pressure arm assembly 200, such as, for example, the one or more leaf spring elements 220, may apply (e.g., via the plurality of pressure contact members 230 connected thereto) a collective pressure that at least substantially counteracts the one or more forces being applied to the printhead pressure arm assembly 200 from the printhead assembly 100 (e.g., resulting from forces from the platen roller 40 and/or the print media pushing the printhead assembly 100 in an upward direction into the printhead pressure arm assembly 200). Consequently, a suitable collective pressure load embodying a uniform counterforce may be exerted by the printhead pressure arm assembly 200 (e.g., via the plurality of pressure contact members 230) onto the printhead assembly 100, thereby depressing the printhead assembly 100 upon the print media with a uniformly distributed pressure that results in uniform and high quality printing content on the print media. The print media, after being printed by the printhead assembly 100, traverses along the web direction A over the platen roller 40 and exits from the printing apparatus 10 through print media exit.

FIG. 3 illustrates a perspective view of a printhead assembly in accordance with various embodiments of the present disclosure. In particular, FIG. 3 illustrates an exemplary printhead assembly 100 comprising a printhead 102, a printhead bracket 104, and a printhead support member 106. An example printhead assembly 100, as described in detail in FIG. 3, may be configured to mate with at least a portion of a platen assembly, such as, for example, a platen roller (e.g., platen roller 40 illustrated in the exemplary embodiment of FIG. 2).

The printhead 102 may be movably received by the printhead bracket 104 to secure the printhead 102 within the printing apparatus 10. In various embodiments, the printhead 102 of an exemplary printhead assembly 100 may comprise a printhead plate (not shown) configured to directly contact a print media (e.g., a label stock and/or the like) and/or an ink ribbon that is in direct contact with the print media in order to facilitate execution of a printing operation (e.g., a thermal transfer printing operation and/or a direct thermal printing operation). In various embodiments, the printhead plate of an exemplary printhead assembly 100 may include a bottom surface oriented so as to face in an at least partially downward direction towards the platen roller disposed below the printhead assembly 100. The printhead assembly 100 may be configured such that the printhead plate defined by the printhead 102 engages at least a portion of a print media passing between the platen roller and the printhead 102 (e.g., beneath the printhead plate) during a printing operation. Further, in various embodiments, the printhead 102 may further include a heat sink (not shown) secured relative to the printhead plate and formed from an extruded heat conductive material, such as aluminum, to facilitate the removal of heat generated by the printhead 202 during the printing operation.

In various embodiments, the printhead assembly 100 may further comprise a printhead support member 106 attached to both the printhead mount 104 and the printhead 102 in order to operatively secure the printhead 102 relative to the printhead mount 104. For example, in various embodiments, the printhead support member 106 may be rotatably secured relative to the printhead mount 104 such that at least a portion of the printhead 102 attached to the printhead support member 106 is configured to move relative to the printhead mount 104 by rotating about the central axis of the printhead support member 106.

Although the printhead 102, the printhead bracket 104 engaged with the printhead 102, and/or the printhead plate (not shown) are described herein with reference to rectangle shapes, the present disclosure contemplates that the printhead 102, the printhead bracket 104 engaged with the printhead 102 (e.g., the top surface 104A), and/or the printhead plate may be of other shapes, such as a square shape, an oblong shape (e.g., an oval), and or any other operable shape, without deviation from the scope of the disclosure.

Figure 4A:
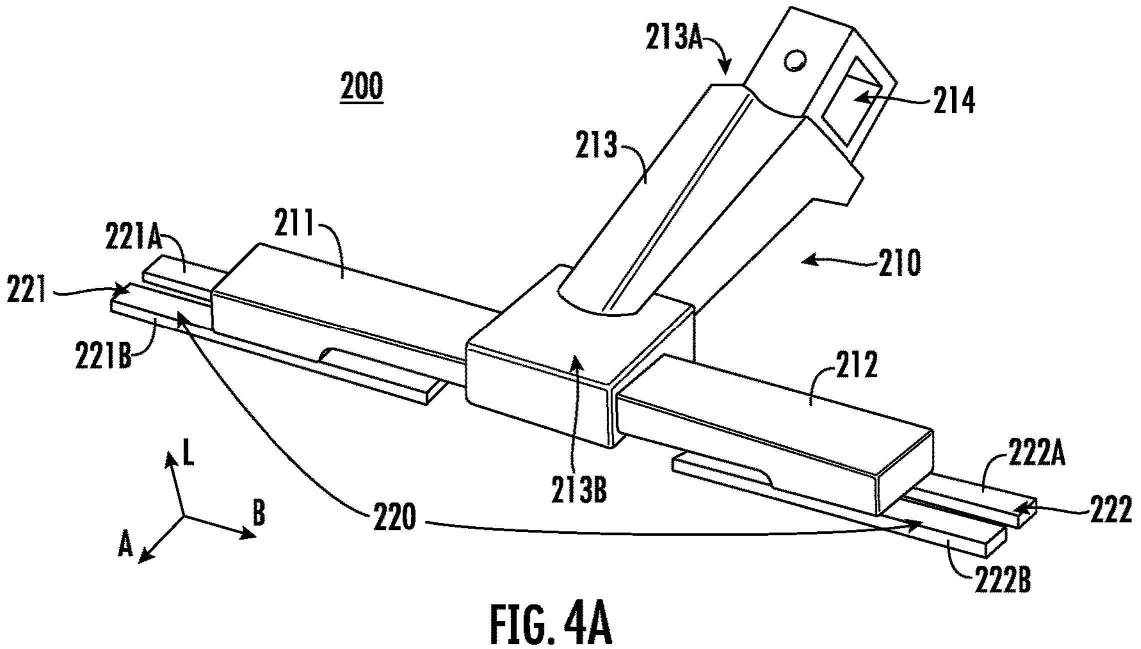
FIGS. 4A and 4B illustrate perspective views of an exemplary printhead pressure arm assembly in accordance with various embodiments of the present disclosure.
Figure 4B:
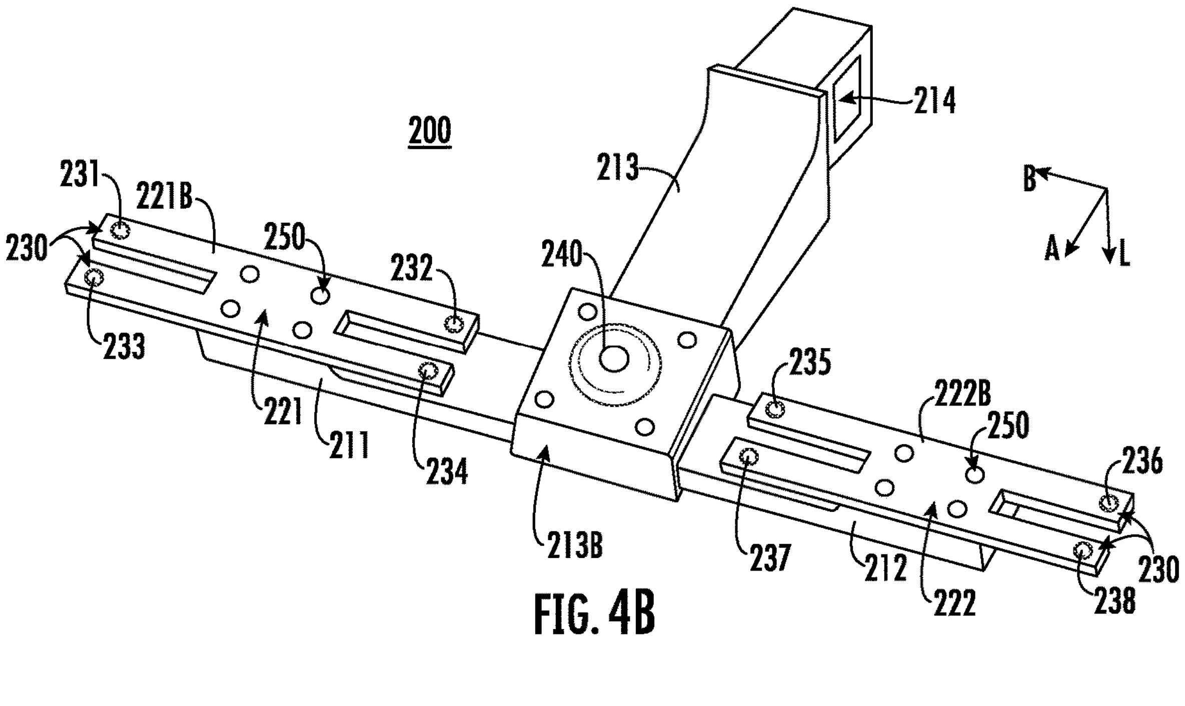

FIGS. 4A and 4B illustrate perspective views of an exemplary printhead pressure arm assembly in accordance with various embodiments of the present disclosure. In particular, FIGS. 4A and 4B illustrate an exemplary printhead pressure arm assembly 200 comprising a pressure arm 210 fixedly secured to a shaft (not shown) to secure the printhead pressure arm assembly 200 in a position relative to the printhead assembly, as described herein. In various embodiments, the pressure arm 210 may comprise an arm base element 213 defined at least in part by a length that extends between a proximal end 213A of the arm base element 213 and a distal end 213B of the arm base element 213. In various embodiments, the pressure arm 210 may be configured to be secured relative to the shaft (not shown) via an attachment aperture 214 disposed adjacent the proximal end 213A of the arm base element 213. The attachment aperture 214 may embody an opening with a cross-sectional configuration that is at least substantially similar to that of the shaft, such that the shaft may be received therethrough. As described herein in reference to the exemplary embodiment of FIG. 2, in various embodiments, the pressure arm 210 may be provided in a position along the length of the shaft disposed within the attachment aperture 214 such that the pressure arm 210 (e.g., the arm base element 213) defines a central lateral position relative to the printhead assembly (not shown) and/or the along the length of the shaft.

In various embodiments, as illustrated, the pressure arm 210 of an exemplary pressure arm assembly 200 may have an at least substantially T-shaped configuration defined by an arm base element 213 and a plurality of distal arm wings including a first distal arm wing 211 and a second distal arm wing 212 extending from a distal end 213B of the arm base element in opposing directions. For example, the first and second distal arm wings 211, 212 may each extend away from arm base element 213 in a respective direction that is at least substantially perpendicular to the length of the arm base element 213. The pressure arm 210 of an exemplary printhead pressure arm assembly 200 may define an at least substantially symmetric configuration over a plane of symmetry defined at a central location along the width of the pressure arm 210 (e.g., the plane of symmetry of the printhead pressure arm assembly 200 is defined by the A-L plane, as illustrated in the exemplary orientation of the embodiment shown in FIGS. 4A and 4B). In such an exemplary configuration, a first lateral side of the printhead pressure arm assembly 200 (e.g., of the pressure arm 210) may embody a mirrored configuration of the opposing second lateral side of the printhead pressure arm assembly 200, as defined over the central plane of symmetry, such that the pressure force applied to the printhead assembly (not shown) from the printhead pressure arm assembly 200 is evenly distributed across the width of the printhead pressure arm assembly 200.

As illustrated in FIGS. 4A and 4B, an exemplary printhead pressure arm assembly 200 may further comprise one or more leaf spring elements 220 disposed relative to a bottom surface of one or more of the distal arm wings (e.g., a first distal arm wing 211 and/or a second distal arm wing 212) and configured to facilitate an at least substantially even and/or uniform distribution of a pressure force being applied to the printhead assembly by the printhead pressure arm assembly 200 when the printhead pressure arm assembly 200 is in the printing position (e.g., during operation of the printing assembly). In various embodiments, each of the one or more leaf spring elements 220 may define a top leaf spring surface configured to be physically abutted against a bottom surface defined by a distal arm wing to which the spring lead element is secured, and an opposing bottom leaf spring surface that faces in a direction at least substantially away from the bottom surface of the distal arm wing. For example, in various embodiments, the one or more leaf spring elements 220 may comprise a first leaf spring element 221 secured relative to the first distal arm wing 211 and a second leaf spring element 222 secured relative to the second distal arm wing 212. As illustrated, the first leaf spring element 221 and the second leaf spring element 222 may define at least substantially identical configurations, such that the first leaf spring element 221 attached to the first distal arm wing 211 has a mirrored configuration relative to second leaf spring element 222 attached to the second distal arm wing 212 over a plane of symmetry defined at a central location along the width of the printhead pressure arm assembly 200 (e.g., a y-z plane oriented along a central axis of the arm base element 213, as illustrated in the exemplary orientation of the embodiment shown in FIGS. 4A and 4B).

Further, as described in further detail herein, a plurality of pressure contact members 230 may be provided at the bottom leaf spring surface in a protruding configuration (e.g., extending outward and/or away from the bottom leaf spring surface) such that the plurality of pressure contact members 230 defines a respective plurality of engagement points at which the printhead pressure arm assembly 200 is configured to physically engage the printhead assembly. In various embodiments, each of the pressure contact members 230 secured to a leaf spring element 221, 222 may be made of an at least partially flexible material configured to facilitate an efficient transfer of one or more forces between the printhead pressure arm assembly 200 (e.g. the leaf spring elements 221, 222) and the printhead assembly with which the printhead pressure arm assembly 200 is engaged. For example, a pressure contact member 230 may be made of a metallic material, a plastic material, a composite material, and/or the like, any combination thereof, and/or any other material configured to operably execute the function of the pressure contact members 230, as described herein. As non-limiting examples, the pressure contact members 230 of an exemplary printhead pressure arm assembly 200 may be made of a plastic material (e.g., an acetal plastic material), a ceramic material, a metal material (e.g., a porous, self-lubricating, bronze metal, an aluminum metal, a stainless steel), a composite material, and/or the like, or any combination thereof. In various embodiments, the pressure contact members 230 may be made of the same material as a leaf spring element 220 to which they are attached.

For example, as illustrated in FIG. 4B, a first plurality of pressure contact members 230 provided at the bottom leaf spring surface 221B of the first leaf spring element 221 may be arranged in a first distribution embodying a mirrored configuration of a second distribution defined by a second plurality of pressure contact members 230 provided at the bottom leaf spring surface 222B of the second leaf spring element 222, as defined over the centerline axis of the pressure arm 210. The mirrored configuration of the first and second pluralities of pressure contact members 230 on the first and second leaf spring elements 221, 222 enables the printhead pressure arm assembly 200 to apply an at least substantially even and/or uniform pressure force to the printhead assembly.

In various embodiments, the plurality of pressure contact members 230 may be at least substantially evenly distributed along the width of the printhead pressure arm assembly 200 such that each pair of laterally adjacent pressure contact members 230 is separated by the same lateral distance, as defined in a width direction (e.g., in the cross-web B-direction, as defined by the orientation of the exemplary embodiment illustrated in FIGS. 4A and 4B). For example, a first pair of laterally adjacent pressure contact members 230 provided on a front end of the bottom surface 221B of the first leaf spring element 221, including a first pressure contact member 231 and a second pressure contact member 232, may be separated by a lateral separation distance (e.g., as defined in the B-direction according to the exemplary orientation of the embodiment illustrated in FIGS. 4A and 4B) that is at least substantially equal to the lateral separation distance defined between a second pair of laterally adjacent pressure contact members 230 provided on a rear end of the bottom surface 221B of the first leaf spring element 221, including a third pressure contact member 233 and a fourth pressure contact member 234. Further, the aforementioned lateral separation distance between the first pair of laterally adjacent pressure contact members 230 may be at least substantially equal to the lateral separation distances separating each of a third pair of laterally adjacent pressure contact members 230 provided on a front end of the bottom surface 222B of the second leaf spring element 222, including a fifth pressure contact member 235 and a sixth pressure contact member 236, and a fourth pair of laterally adjacent pressure contact members 230 provided on a rear end of the bottom surface 222B of the second leaf spring element 222, including a seventh pressure contact member 237 and an eight pressure contact member 238.

Further still, in various embodiments, the aforementioned lateral separation distance between each of the aforementioned pairs of laterally adjacent pressure contact members 230 may be at least substantially equal to a lateral separation distance provided between a pair of laterally adjacent pressure contact members 230 defined by pressure contact members attached to different leaf spring elements. For example, as illustrated in FIG. 4B, the lateral separation distance defined between the second pressure contact member 232 provided on the front end of the bottom surface 221B of the first leaf spring element 221 and the fifth pressure contact member 235 provided on the front end of the bottom surface 222B of the second leaf spring element 222 may be the same as the lateral separation distance defined between the second pressure contact member 232 and the first pressure contact member 231. In various embodiments, the aforementioned distance _ may vary based at least in part on the number of pressure contact members secured to the one or more leaf spring elements 220 of the printhead pressure arm assembly 200, the width of the printhead pressure arm assembly 200, and/or any number of other factors that may affect and/or be defined by the operative width of the printhead pressure arm assembly 200.

Figure 5:
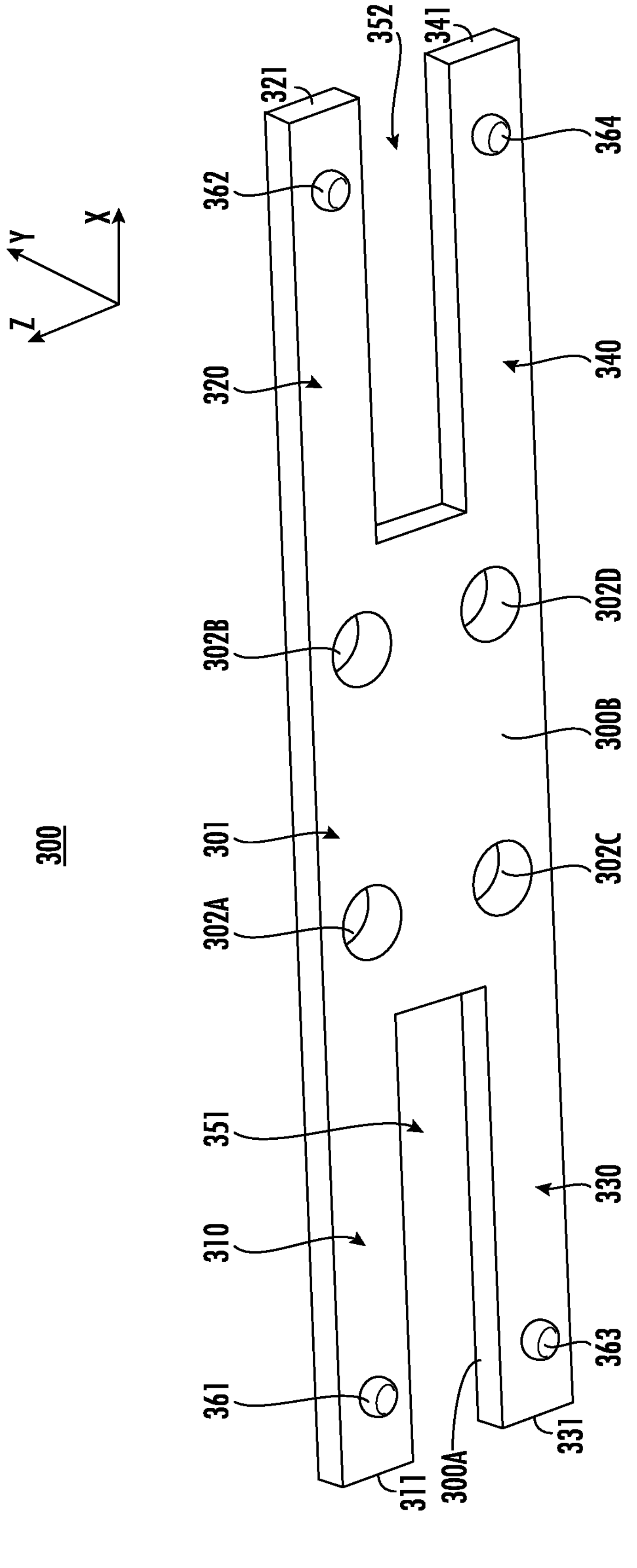
FIG. 5 illustrates a perspective view of a leaf spring element of an exemplary printhead pressure arm assembly in accordance with various embodiments of the present disclosure.

FIG. 5 illustrates a perspective view of an exemplary leaf spring element in accordance with various embodiments described herein. In various embodiments, an exemplary leaf spring element 300 may embody a plate element defining an at least partially flexible configuration that enables at least a portion of the leaf spring element 300 to undergo an at least partially elastic deformation to accommodate for an uneven distribution of forces being applied to plurality of contacts points associated with the leaf spring element 300. In various embodiments, the leaf spring element 300 defines a flexible configuration that enables at least a portion of the 300, in response to a change in force being applied thereto, to move in one or more vertical directions (e.g., in the y-direction as defined by the exemplary orientation of the embodiment illustrated in FIG. 5) such that the leaf spring element 300 may maintain contact with the printhead assembly without requiring any movement and/or adjustment of the pressure arm to which the leaf spring element 300 is attached.

In various embodiments, as described in further detail herein, each leaf spring element 300 of an exemplary printing apparatus may be configured to undergo an at least substantially elastic deformation between a first configuration (e.g., a nominal configuration) and a second configuration (e.g., an at least partially flattened configuration) in response to the printhead assembly against which the leaf spring element 300 applies a uniform pressure force (e.g., via a plurality pressure contact members 360 attached to the bottom surface 300B) being moved in the vertical direction relative to the pressure arm to which the leaf spring element 300 is fixedly secured. In particular, as the printhead assembly moves vertically towards and/or away from the pressure arm to which the leaf spring element 300 is attached, such as, for example, as a result of a change in print media thickness, a misalignment of one or more printer apparatus components, and/or the like, the leaf spring element 300 remains biased towards maintaining a continuously applied pressure against the printhead assembly that uniformly pushes the printhead assembly towards a platen roller. For example, each leaf spring element 300 may be configured to elastically deform to enable each of the contact points (e.g., the plurality pressure contact members 360) at which the leaf spring element 300 is engaged with the printhead assembly to move at least partially independently of one another such that, regardless of the relative vertical positioning of the printhead assembly, a collective pressure force being applied to the printhead assembly from the leaf spring element 300 (e.g., via respective forces at each of the pressure contact members 360) maintains an even distribution throughout the elastic deformation of the leaf spring element 300.

In various embodiments, an exemplary leaf spring element 300 may comprise an at least partially elongated material plate comprising a top surface 300A and a bottom surface 300B with a material thickness defined therebetween. The material thickness of an exemplary leaf spring element 300 may depend on the dimensions of the leaf spring element 300 and/or the material of the leaf spring element 300, (e.g., one or more material properties thereof, such as, for example, the material hardness, material stiffness, and/or the like). In various embodiments, the leaf spring element 300 may be made of an at least partially flexible material configured to elastically deform between a variety of configurations (e.g., a nominal configuration, an at least partially actuated configuration) in response to a variable force being applied thereto from a printhead assembly engaged with the leaf spring element 300. For example, a leaf spring element 300 may be made of a metallic material, a plastic material, a composite material, and/or the like, any combination thereof, and/or any other material configured to operably execute the function of the leaf spring element 300, as described herein. As non-limiting examples, the leaf spring element 300 of an exemplary printhead pressure arm assembly may be made of a spring steel material, a stainless steel material (e.g., a 301 high yield stainless steel material), Elgiloy, Havar, Inconel, and/or the like, or any combination thereof.

In various embodiments, the leaf spring element 300 may include at least one fastening aperture that extends through the thickness of the leaf spring element 300 (e.g., perpendicularly between the bottom surface 300B and the top surface 300A) and is configured to receive a fastening means therein to secure (e.g., attach) at least a portion of the leaf spring element 300 to an adjacent bottom surface of the pressure arm (e.g., defined by a distal arm wing bottom surface). For example, as illustrated, the exemplary leaf spring element 300 comprises a plurality of apertures, including a first aperture 302A, a second aperture 302B, a third aperture 302C, a fourth aperture 302D, extending through the thickness of the central portion 301 of the leaf spring element 300. In various embodiments, the exemplary leaf spring element 300 may be configured to be secured to a bottom surface of a pressure arm (e.g., of a distal arm wing) via an engagement of at least one fastening element disposed within one of the apertures (e.g., a first aperture 302A, a second aperture 302B, a third aperture 302C, a fourth aperture 302D) defined by the central portion 301 with an adjacent bottom surface of the pressure arm (e.g., a distal arm wing bottom surface). As non-limiting examples, in various embodiments, such an exemplary fastening means may comprise a bolt, a pin, a latch, a hook, and/or any other suitable mechanical fastening means configured to engage both an aperture defined through the central portion 301 and a bottom surface of the pressure arm to secure at least a portion of the top surface 300A of the leaf spring 300 relative to (e.g., against) the bottom surface of the pressure arm.

In various embodiments, the flexible configuration of an exemplary leaf spring element 300 having a central portion 301 rigidly secured to a distal arm wing of the pressure arm may be defined at least in part by a plurality of extension portions that each define a respective distal end configured to move relative to the central portion 301 in one or more vertical directions (e.g., in the y-direction as defined in the orientation of the exemplary embodiment illustrated in FIG. 5) in response to one or more forces being imparted on the leaf spring element 300 from a printhead assembly engaged therewith. For example, as illustrated, an exemplary leaf spring element 300 may define a plurality of extension portions 310, 320, 330, 340 extending in one or more outward directions away from the central portion 301. In various embodiments, each of the plurality of extension portions of the leaf spring element 300 may define a cantilevered configuration wherein each extension portion is cantilevered at a respective proximal end thereof defined at least substantially adjacent the central portion 301. Further, each of the respective distal ends of the first, second, third and fourth extension portions 310, 320, 330, 340 (e.g., the first, second, third, and fourth distal ends 311, 321, 331, 341) may be configured to move independently of one another in one or more vertical directions along respective vertical axes (e.g., in the y-direction as defined in the exemplary orientation of the embodiment illustrated in FIG. 5) based on one or more pressure forces being imparted thereon.

In various embodiments, the leaf spring element 300 may define an at least substantially symmetric configuration over a plane of symmetry defined at a central location along the width of the leaf spring element 300 (e.g., the plane of symmetry of the leaf spring element 300 is defined by the y-z plane, as illustrated in the exemplary orientation of the embodiment shown in FIG. 5) such that the extension portions defining a first lateral side of the leaf spring element 300 (e.g., a first extension portion 310 and a third extension portion 330) are arranged in a mirrored configuration relative to those extension portions defining a second lateral side of the leaf spring element 300 (e.g., a second extension portion 320 and a fourth extension portion 340). Further, the leaf spring element 300 may define an at least substantially symmetric configuration over a plane of symmetry defined at a central location along the length of the leaf spring element 300 (e.g., the plane of symmetry of the leaf spring element 300 is defined by the x-y plane, as illustrated in the exemplary orientation of the embodiment shown in FIG. 5) such that the extension portions defining a front side of the leaf spring element 300 (e.g., the first extension portion 310 and the second extension portion 320) are arranged in a mirrored configuration relative to those extension portions defining a back side of the leaf spring element 300 (e.g., a third extension portion 330 and a fourth extension portion 340). As a non-limiting example, the leaf spring element 300 may define an H-shaped configuration, wherein the leaf spring element 300 comprises a central portion 301, a first set of parallel extension portions, including a first extension portion 310 and a third extension portion 330, extending away from a first side of the central portion 301 (e.g., in the negative x-direction as defined in the exemplary orientation of the embodiment illustrated in FIG. 5) along parallel axes defined within at least substantially the same plane, and a second set of parallel extension portions, including a second extension portion 320 and a fourth extension portion 330, extending away from an second side of the central portion 301 opposite the first side (e.g., in the positive x-direction as defined in the exemplary orientation of the embodiment illustrated in FIG. 5) along parallel axes defined within at least substantially the same plane.

In various embodiments, an exemplary printhead pressure arm assembly may comprise a plurality of pressure contact members 360 arranged along the bottom surface 300B of the leaf spring element 300. The plurality of pressure contact members 360 may be configured to physically abut a respective portion of the printhead assembly, so as to define a plurality of contact points at which the leaf spring element 300 is configured to remain engaged with the printhead assembly. The plurality of pressure contact members 360 may be uniformly distributed about the bottom surface 300B of the leaf spring element 300 such that the collective force applied to the printhead assembly from the leaf spring component 300 via the plurality of pressure contact members 360 is at least substantially uniform and/or evenly distributed throughout a force area defined in between the plurality of pressure contact members 360.

As illustrated in FIG. 5, an exemplary leaf spring element 300 defining a plurality of flexible extension portions 310, 320, 330, 340 extending away from central portion 301 rigidly secured to an adjacent surface of the rigid pressure arm may have a corresponding plurality of pressure contact members 360 attached to the bottom surface 300B thereof. As illustrated, a pressure contact member may be positioned at each of the respective distal ends defined by the plurality of extension portions 310, 320, 330, 340 of the leaf spring element 300. For example, a plurality of pressure contact members secured to the bottom surface 300B of the leaf spring element 300 may be defined by four pressure contact members, including a first pressure contact member 361 provided on the bottom surface 300B at least substantially adjacent a first distal end 311 of the first extension portion 310, a second pressure contact member 362 provided on the bottom surface 300B at least substantially adjacent a second distal end 321 of the second extension portion 320, a third pressure contact member 363 provided on the bottom surface 300B at least substantially adjacent a third distal end 331 of the third extension portion 330, and a fourth pressure contact member 364 provided on the bottom surface 300B at least substantially adjacent a fourth distal end 341 of the fourth extension portion 340.

As an illustrative example, an exemplary leaf spring element 300 comprising a central portion 301 and a plurality of extension portions (e.g., first extension portion 310, second extension portion 320, third extension portion 330, and fourth extension portion 340) cantilevered relative thereto to define an H-shaped configuration may be configured to flexibly accommodate a change in the vertical position of a printhead assembly engaged therewith by the forces being imparted on each of the four pressure contact members 361, 362, 363, 364 from the printhead assembly causing the respective distal end of each of the four extension portions 310, 320, 330, 340 (e.g., distal ends 311, 321, 331, 341) to exhibit an independent vertical movement (e.g., in the y-direction, as defined by the orientation of the exemplary embodiment illustrated in FIG. 5) relative to the rigidly positioned central portion 301. For example, in an exemplary circumstance wherein a portion of the printhead assembly engaged with leaf spring element 300 is moved in an upward direction towards the rigidly positioned towards the pressure arm (e.g., in the positive y-direction, as defined by the orientation of the exemplary embodiment illustrated in FIG. 5), the leaf spring element 300 may be configured to generate one or more elastic forces defined by the elastic configuration of the leaf spring element 300 that bias each of the extension portions 310, 320, 330, 340 of the leaf spring element 300 back towards. Such elastic forces generated by the leaf spring element 300 may embody counterforces that are imparted on the printhead assembly via the plurality of pressure contact members 360 to at least partially counteract the additional forces being applied to the printhead pressure arm assembly (e.g., to the leaf spring element 300 via the pressure contact members 360) by the printhead assembly, thereby enabling the leaf spring element 300 (e.g., and, thus, the printhead pressure arm assembly) to at least substantially continuously apply a pressure force against the printhead assembly engaged therewith.

For example, upon the portion of the printhead assembly that is physically abutted against the plurality of pressure contact members 360 (e.g., the printhead and/or the printhead mount) being moved in an upward vertical direction (e.g., in the positive y-direction as defined in the orientation of the exemplary embodiment illustrated in FIG. 5) such that an additional pushing force is applied from the printhead assembly to each of the plurality of pressure contact members 360, the plurality of pressure contact members 360 may each be moved, rearranged, and/or otherwise repositioned along a respective vertical axis relative to the central portion 301 such that the leaf spring element 300 is reconfigured from a nominal configuration to an at least partially compressed configuration. For example, the leaf spring element 300 may be configured such that, upon being reconfigured to the at least partially compressed configuration (e.g., from a nominal configuration), the collective pressure force being applied to the printhead assembly from the leaf spring element 300 (e.g., via the plurality of pressure contact members 360) may be increased based at least in part on the leaf spring element 300 being biased towards a nominal configuration and generating an increased elastic force that acts to push against the printhead assembly (e.g., in the negative y-direction as defined by the orientation of the exemplary embodiment illustrated in FIG. 5) when the leaf spring element 300 is in such an at least partially compressed configuration.

While the shape of the leaf spring element 300 may be an H-shaped configuration in various embodiments, as illustrated in FIGS. 4A-4B and 5, the present disclosure contemplates that the shape of the leaf spring element 300 may be defined by a shape that is symmetrical in both the width and length directions (e.g., bilaterally symmetrical) without deviating from the scope of the disclosure. Further, while the cross-sectional configuration of the leaf spring element 300 may define an at least substantially planar configuration in various embodiments, as illustrated in FIGS. 4A-4B and 5, the present disclosure contemplates that the leaf spring element 300 may be defined by an at least substantially curved cross-sectional configuration having a lateral curvature that is symmetrical in the width direction without deviating from the scope of the disclosure Referring back to the exemplary embodiment illustrated in FIG. 2, the pressure arm 210 of the exemplary printhead pressure arm assembly 200 may be fixedly secured to the shaft 20 in a position at least substantially above the printhead assembly 100 such that each of the plurality of pressure contact members distributed along the respective bottom surfaces of the first and second leaf spring elements 221, 220 disposed below the first and second distal arm wings 211, 212 of the pressure arm 210, respectively, are physically engaged with a surface of the printhead assembly 100 (e.g., a top surface of the printhead bracket 104) and configured to apply a respective pressure force to the printhead assembly in an at least substantially downward direction towards the platen roller (e.g., in the negative L-direction as defined by the orientation of the exemplary embodiment illustrated in FIG. 2). For example, the evenly distributed collective force applied by the printhead pressure arm assembly 200 onto the printhead assembly 100 (e.g. via the plurality of pressure contact members provided along the plurality of leaf spring elements 220) may embody a counterforce that opposes the pushing force being imparted thereon from the printhead assembly 100. As such, printhead pressure arm assembly 200 may be configured such that the collective pressure force imparted on the printhead assembly 100 may vary based at least in part on the position of the printhead assembly 100 relative to the pressure arm 210 (e.g., relative to the bottom surfaces of the first and second distal arm wings 211, 212), as measured in the vertical direction (e.g., in the L-direction as defined by the orientation of the exemplary embodiment illustrated in FIG. 2).

In particular, a change in the vertical position of the printhead assembly 100 relative to the pressure arm 210 resulting from, for example, a change in print media thickness, a realignment of one or more internal components of the printing apparatus 10 (e.g., an adjacent component of the printing assembly 14), and/or the like, the pushing force being applied to each of the pressure contact members defined by the printhead pressure arm assembly 200 from the printhead assembly 100 may vary. As described herein, the flexible configuration of each of the one or more leaf spring elements 220 of the printhead pressure arm assembly 200 (e.g., the first and second leaf spring elements 221, 222) may enable the change in pushing force to be realized by each leaf spring element 220 such that, based at least in part on the leaf spring elements 220 being configured for elastic deformation and biased towards a nominal configuration in which the leaf spring element 220 remains in elastic contact with the printhead assembly 100, each leaf spring element 220 is reconfigured in a way that maintains a responsive collective pressure force being applied back onto the printhead assembly 100 in an evenly distributed manner.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A printhead pressure arm assembly-hog-device, the printhead pressure arm assembly comprising:

a pressure arm comprising:

an arm base element defined at least in part by an arm base length oriented in a first direction; and one or more distal arm wings extending from a distal end of the arm base element in one or more outward directions perpendicular to the first direction;

wherein the pressure arm defines a T-shaped configuration based at least in part on the one or more distal arm wings extending perpendicularly outward from the distal end of the arm base element; and one or more leaf spring elements operably secured to a respective bottom surface of each of the one or more distal arm wings, each of the one or more leaf spring elements being configured to operatively engage at least a portion of a printhead assembly;

wherein each of the one or more leaf spring elements defines a flexible configuration such that an operative engagement of the one or more leaf spring elements with the printhead assembly is defined by an elastic contact; and wherein the one or more leaf spring elements define one or more evenly distributed contact points through which the printhead pressure arm assembly is configured to apply a collective pressure force onto the printhead assembly in an at least substantially uniform distribution.

2. The printhead pressure arm assembly of claim 1, wherein the one or more leaf spring elements is defined by a first leaf spring element secured to a first portion of the one or more distal arm wings and a second leaf spring element secured to a second portion of the one or more distal arm wings, wherein the first leaf spring element and the second leaf spring element define an at least substantially symmetric configuration over a plane of symmetry extending in the first direction.

3. The printhead pressure arm assembly of claim 1, wherein the one or more distal arm wings comprises a first distal arm wing extending from the distal end of the arm base element in a first perpendicular direction and a second distal arm wing extending from the distal end of the arm base element in a second perpendicular direction opposite the first perpendicular direction.

4. The printhead pressure arm assembly of claim 1, wherein the pressure arm is configured for coupling to one or more internal printer components via an attachment features defined at a proximal end of the arm base element.

5. The printhead pressure arm assembly of claim 4, wherein the attachment features defines an attachment aperture configured to receive a shaft component therethrough to fixedly secure the printhead pressure arm assembly in a position above the printhead assembly.

6. The printhead pressure arm assembly of claim 5, wherein the shaft component is oriented in a width direction and the pressure arm is secured at a central position along a width the shaft component.

7. The printhead pressure arm assembly of claim 1, wherein the one or more leaf spring elements are made of at least one or more of a spring steel material and a stainless steel material.

8. The printhead pressure arm assembly of claim 1, wherein one or more contact points defined by the one or more leaf spring elements are defined by a plurality of pressure contact members uniformly distributed along one or more bottom surfaces of the one or more leaf spring elements.

9. The printhead pressure arm assembly of claim 8, wherein the plurality of pressure contact members is evenly distributed along a width of the one or more leaf spring elements such that the plurality of pressure contact members is configured to facilitate transmission of the collective pressure force to the printhead assembly engaged therewith.

10. The printhead pressure arm assembly of claim 9, wherein the plurality of pressure contact members includes a first set of pressure contact members disposed along a first bottom surface defined by a first leaf spring element coupled to first distal arm wing and a second set of pressure contact members disposed along a second bottom surface defined by a second leaf spring element coupled to a second distal arm wing.

11. The printhead pressure arm assembly of claim 10, wherein the plurality of pressure contact members defines eight pressure contact members evenly distributed along a width of the printhead pressure arm assembly.

12. The printhead pressure arm assembly of claim 10, wherein the first set of pressure contact members and the second set of pressure contact members are each defined by four pressure contact members.

13. The printhead pressure arm assembly of claim 1, wherein each of the one or more leaf spring elements comprises:

a central portion fixedly secured to a bottom surface of the one or more distal arm wings defined by the pressure arm, and one or more extension portions extending from the central portion.

14. The printhead pressure arm assembly of claim 13, wherein a pressure contact member configured to physically contact the printhead assembly is provided on a bottom surface of a leaf spring element at least substantially adjacent a distal end of the one or more extension portions.

15. The printhead pressure arm assembly of claim 14, wherein each of the one or more leaf spring elements defines an H-shaped configuration defined in part by four extension portions extending from the central portion, and wherein a respective one of four pressure contact members is disposed at each distal end of the four extension portions defined by the H-shaped configuration.

16. The printhead pressure arm assembly of claim 15, wherein the respective distal ends of the one or more extension portions moving relative to the central portion defines an elastic deformation of a leaf spring element.

17. The printhead pressure arm assembly of claim 13, wherein the flexible configuration of each of the one or more leaf spring elements is defined by the respective distal ends of each of the one or more extension portions of a leaf spring element being configured to move in one or more vertical directions relative to the central portion fixedly secured to the pressure arm.

18. The printhead pressure arm assembly of claim 13, wherein each leaf spring element defines an at least substantially symmetrical configuration defined by a first one or more extension portion provided on a first lateral side of the central portion having a mirrored configuration relative to a second one or more extension portion provided on a second lateral side of the central portion.

19. The printhead pressure arm assembly of claim 1, wherein each of the one or more leaf spring elements defines a nominal configuration in which a leaf spring element has an at least substantially flat planar configuration.

20. A printing apparatus comprising a printhead pressure arm assembly, the printhead pressure arm assembly comprising:

a pressure arm comprising:

an arm base element defined at least in part by an arm base length oriented in a first direction; and one or more distal arm wings ending from a distal end of the arm base element in one or more outward directions perpendicular to the first direction;

wherein the pressure arm defines a T-shaped configuration based at least in part on the one or more distal arm wings extending perpendicularly outward from the distal end of the arm base element; and one or more leaf spring elements operably secured to a respective bottom surface of each of the one or more distal arm wings, each of the one or more leaf spring elements being configured to operatively engage at least a portion of a printhead assembly;

wherein each of the one or more leaf spring elements defines a flexible configuration such that an operative t of the one or more leaf spring elements with the printhead assembly is defined by an elastic contact; and wherein the one or more leaf spring elements define one or more evenly distributed contact points through which the printhead pressure arm assembly is configured to apply a collective pressure force onto the printhead assembly in an at least substantially uniform distribution.

* * * * *